No. 649,314. Patented May 8, 1900.
G. A. KELLY.
UNDERCHECK DEVICE FOR HORSES.
(Application filed Sept. 9, 1899.)
(No Model.)
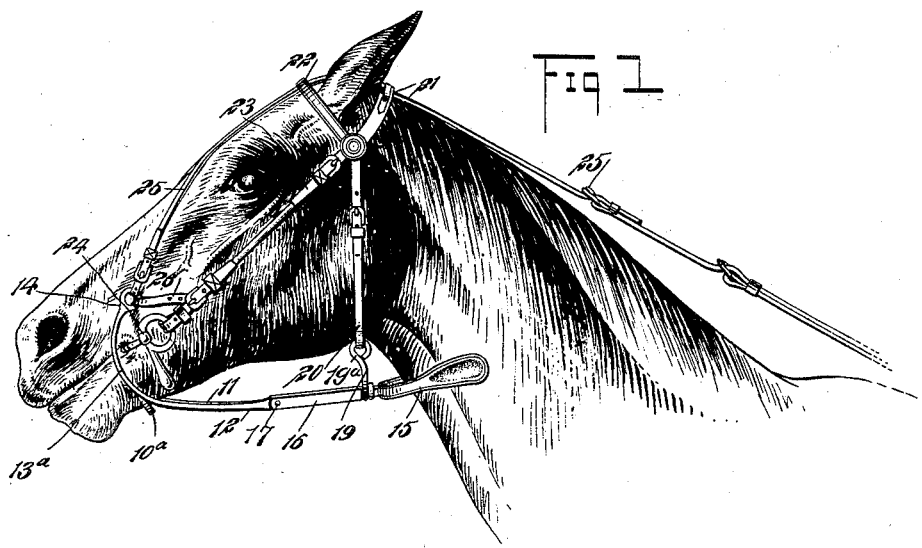
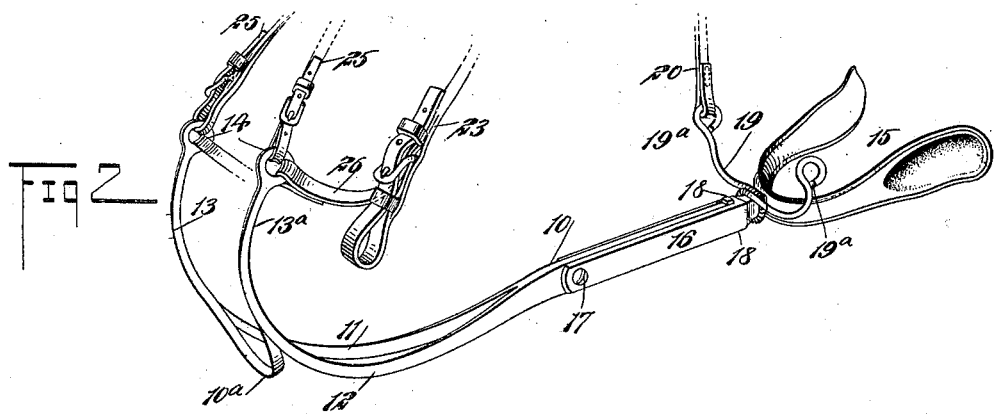
WITNESSES:
INVENTOR
G. A. Kelly
BY
ATTORNEYS

UNITED STATES PATENT OFFICE.

GEORGE ALLEN KELLY, OF DAYTON, WASHINGTON, ASSIGNOR OF ONE-HALF TO GEORGE B. BAKER, OF SAME PLACE.

UNDERCHECK DEVICE FOR HORSES.

SPECIFICATION forming part of Letters Patent No. 649,314, dated May 8, 1900.

Application filed September 9, 1899. Serial No. 729,971. (No model.)

*To all whom it may concern:*

Be it known that I, GEORGE ALLEN KELLY, of Dayton, in the county of Columbia and State of Washington, have invented a new and Improved Bridle Attachment, of which the following is a full, clear, and exact description.

One object of the invention is to provide an attachment to a bridle which will render it unnecessary for the horse to be unduly checked up and which will likewise prevent the horse's pulling too strongly upon the reins or choking.

Another object of the invention is to so construct an attachment to bridles that one bit only will be required in the mouth and an unruly horse be effectually controlled with a single bit, and the chin-strap and nose-band may be dispensed with.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1 is a side elevation of the improved attachment applied to a bridle, the bridle and device being in position upon an animal; and Fig. 2 is a perspective view of the attachment and a portion of a bridle.

The device consists of a shank 10, adapted to be passed in direction of the neck beneath the head of the horse, which shank 10 at its forward end is bifurcated, forming two forwardly-extending diverging members 11 and 12, which are also slightly curved, so that their upper surfaces are concaved and their lower surfaces convexed. These members 11 and 12 are curved decidedly upward and thence slightly rearward, forming forward arms 13 and 13ª, each of said arms terminating in an eye 14. A curved connecting-bar 10ª extends from the member 11 to the member 12 of the device, where the said members connect with the forward curved arms 13 and 13ª. The connecting-bar 10ª has a concaved upper and a convexed under surface and serves as a substitute for a chin-strap, being adapted for engagement with the chin of the animal.

A yoke 15 is used in connection with the body-shank 10 of the device, the said yoke being practically horizontal and of such shape that it will engage with the sides of the neck of the animal, leaving the windpipe free, as shown in Fig. 1. This yoke may be made of any desired material and may be padded, if necessary. The yoke is provided with a bifurcated shank 16, which receives between its members the body-shank 10. The bifurcated shank 16 at its forward end is connected with the main shank 10 through the medium of a screw 17 or its equivalent, and the main shank 10 is securely held at its rear end within the bifurcated shank 16 of the yoke by means of lips 18, located at the top and bottom of the main shank 10, extending in opposite directions over the members of the bifurcated yoke-shank 16.

An upwardly-arched bar 19 is secured upon the yoke-shank 16 between its bifurcated portion and the yoke 15. This arched bar 19 terminates in eyes 19ª, and the ends of a throat-strap 20 are secured to the eyes 19ª of the said yoke 19. The bridle, in addition to the throat-strap 20, consists of the usual head-band 21, brow-band 22, and cheek-straps 23, the latter being attached to the snaffle-bit 24 or any other approved form of bit, and when the bit is in the mouth of the horse the arms 13 and 13ª are slightly in advance of the bit, as shown in Fig. 1.

An overdraw-check 25 is attached at its lower ends to the eyes 14 of the forward upwardly-curved arms 13 and 13ª of the device, and billets 26 are preferably employed to connect the cheek-straps 23 with the upper ends of the said arms 13 and 13ª, as is also shown in Fig. 1.

It will be observed that the device has bearing at its rear end against the throat of the animal and effectually prevents the animal placing its head in such position as to cause a choking sensation. Furthermore, it will be observed that the horse cannot pull to any objectionable extent upon the reins, since in doing so the head must be elongated, and the chin-bar will so engage with the chin as to check such tendency. It will also be noted that the device will support the head of the horse in an easy position, the checkrein being employed only to assist in holding the device in place, and it is obvious that but a single bit need be employed and that the horse with but a single bit and the attachment described will be under almost complete control, since the head of the animal can be extended only a certain distance, and the head cannot be dropped to any dangerous extent. The head, however, may be tossed to relieve tension. In fact, the head may be moved in any direction, with the exception of drawing the chin back against the neck.

Having thus described my invention, I claim as new and desire to secure by Letters Patent—

A bridle attachment, comprising a yoke adapted to bear against the neck of a horse, a shank in connection with the yoke and having its front portion bifurcated to form two arms which are curved upward at each side of the head of the horse, a cross or connecting bar extending between said arms in position to pass under the chin of the horse and to engage therewith, the upper ends of the arms having means for connecting them with the bridle and with the checkrein, so that the said arms may be drawn upward and rearward to press the connecting or cross bar against the chin of the horse, and means for supporting the yoke and the rear portion of the shank in position.

In testimony whereof I have signed my name to this specification in the presence of two subscribing witnesses.

GEORGE ALLEN KELLY.

Witnesses:
 FRANK W. DURBIN,
 B. B. COLBATH.